(12) United States Patent
Lin et al.

(10) Patent No.: US 8,009,161 B2
(45) Date of Patent: Aug. 30, 2011

(54) DIFFERENTIAL SIGNAL INTERFACING DEVICE AND RELATED METHOD

(75) Inventors: Jr-Ching Lin, Kao-Hsiung (TW); Yueh-Hsiu Liu, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 886 days.

(21) Appl. No.: 12/019,639

(22) Filed: Jan. 25, 2008

(65) Prior Publication Data

US 2009/0096775 A1   Apr. 16, 2009

(30) Foreign Application Priority Data

Oct. 11, 2007   (TW) ............................... 96137997 A

(51) Int. Cl.
  *G09G 5/00*   (2006.01)
(52) U.S. Cl. .......................................... 345/213; 345/98
(58) Field of Classification Search .................. 345/204, 345/213, 98–100
  See application file for complete search history.

(56) References Cited

U.S. PATENT DOCUMENTS

| 6,356,260 | B1 * | 3/2002 | Montalbo | 345/204 |
| 7,817,132 | B2 * | 10/2010 | Lee et al. | 345/102 |
| 2007/0008273 | A1 * | 1/2007 | Chen et al. | 345/100 |
| 2007/0216630 | A1 * | 9/2007 | Liao | 345/100 |
| 2008/0291147 | A1 * | 11/2008 | Fan et al. | 345/98 |

FOREIGN PATENT DOCUMENTS

CN   1991955 A   7/2007

\* cited by examiner

*Primary Examiner* — Jimmy H Nguyen
(74) *Attorney, Agent, or Firm* — Winston Hsu; Scott Margo

(57) ABSTRACT

The present invention provides a differential signal interfacing device, including a reduced swing differential signaling (RSDS) transmitter and a plurality of RSDS receivers, in order to improve RSDS signal capacity. The RSDS transmitter is coupled to the plurality of RSDS receivers via a bus and transmits a RSDS signal in a discontinuous manner. The plurality of RSDS receivers receives the RSDS signal for signals of different types.

12 Claims, 7 Drawing Sheets

DIFFERENTIAL SIGNAL INTERFACING DEVICE AND RELATED METHOD

BACKGROUND OF THE INVENTION

1. Field of the Invention

The present invention relates to a differential signal interfacing device and related method, and more particularly to a reduced swing differential signaling (RSDS) interfacing device and related method.

2. Description of the Prior Art

In the existing driving circuits of display devices, a Reduced Swing Differential Signal (RSDS) interface is commonly used transmission interface. A typical driving circuit includes a timing controller and source drivers. The timing controller utilizes a number of transmission line pairs to transmit RSDS signals to the source drivers in a bus manner. Each RSDS signal corresponds to a transmission line pair and can be defined into one signal type. In general, the RSDS signal for one transmission line pair is defined as a clock signal and the RSDS signals for the rest of the transmission line pairs are defined as data signals, each representing one-bit data.

Please refer to FIG. 1, which is a schematic diagram of a display device 10 according to the prior art. The display device 10 includes a timing controller TCON_PA and source drivers SD_PA1-SD_PAm. The timing controller TCON_PA uses the RSDS interface, and thereby transmits a data signal DATA_PA with a transmission line pair L1 and a clock signal CLK with a transmission line pair L2. Furthermore, the timing controller TCON_PA transmits a start-up signal DIO to the source drivers SD_PA1 with a transistor-to-transistor logic (TTL) signaling interface. The source drivers SD_PA1-SD_Pam transmit the start-up signal DIO in a cascading manner. That is, the source drivers SD_PA2-SD_Pa(m−1) delay the start-up signal DIO and thereby generate start-up signals DIO2-DIO(m−1) for the following source driver.

When the display device 10 prepares to output an image frame to its panel, the timing controller TCON_PA transmits the start-up signal DIO to the source drivers SD_PA1. Subsequently, the source drivers SD_PA1 waits a predefined time and then derives the data signal DATA_PA from the transmission line pair L1. And then, the source driver SD_PA1 outputs the start-up signal DIO2 to the following source driver SD_PA2. When receiving the start-up signal DIO2 from the source driver SD_PA1, the source driver SD_PA2 performs the same operations as the source driver SD_PA1 does, waiting a predefined time and then deriving the data signal DATA_PA from the transmission line pair L1. The source drivers SD_PA3-SD_PAm also operate in the same way. In the end, the timing controller TCON_PA can transfer all data of the image frame to the source drivers SD_PA1-SD_PAm.

Please refer to FIG. 2, which is a schematic diagram of signal waveforms of the display device 10. FIG. 2 only depicts partial waveforms for simplicity. From top to bottom, the shown waveforms are the clock signal CLK, the start-up signal DIO, the start-up signal DIO2, the start-up signal D1O3 and the data signal DATA_PA. The data signal DATA_PA includes signal intervals SD_PA_DATA1 and SD_PA_DATA2, which are valid intervals for the source drivers SD_PA1 and SD_PA2 respectively to derive data, and other intervals are omitted here. The obliquely lined interval of the data signal DATA_PA means that no RSDS signals are outputted from the timing controller TCON_PA. In FIG. 2, the signal intervals SD_PA_DATA1 and SD_PA_DATA2 lag behind the start-up signals DIO and DIO2 for a predefined time, respectively. The relationship between the data signal intervals and associated start-up signals allows the source drivers SD_PA1 and SD_PA2 to derive data successfully.

However, the start-up signals DIO1-DIO(m−1) are easily affected by noise due to their TTL signal form. In addition, since the clock signal CLK is a differential signal, the skew between the start-up signals DIO1-DIO(m−1) and the clock signal CLK is difficult to control. Furthermore, the start-up signals DIO1-DIO(m−2) must be delayed in the source drivers for less than a clock cycle of the clock signal CLK, so that any of the source drivers will not be triggered to derive data at the wrong times. In this situation, the start-up signals DIO1-DIO(m−2) have to be delayed for a shorter time in the source drivers as the clock signal CLK is increased in frequency. Therefore, the delays of the start-up signals DIO1-DIO(m−2) and the system clock rate become a trade-off under guarantee of correct timings used for the source drivers to derive the image data.

SUMMARY OF THE INVENTION

The present invention therefore provides a differential signal interfacing device and related method that discontinuously transmit a RSDS signal to prevent the source drivers from using incorrect timings to derive data.

The present invention discloses a differential signal interfacing device comprising a differential signal transmitter and a plurality of differential signal receivers. The differential signal transmitter couples to the plurality of differential signal receivers via a bus and is used for discontinuously transmitting an RSDS signal. The plurality of differential signal receivers is used for receiving the RSDS signal.

The present invention further discloses a differential signaling method comprising discontinuously transmitting an RSDS signal and receiving the RSDS signal. The differential signaling method is preferably applied in bus architecture.

The present invention further discloses a display device for improving internal transmission efficiency. The display device includes a timing controller, a plurality of source drivers, a differential signal transmitter and a plurality of differential signal receivers. The timing controller is used for generating a plurality of data signals and a plurality of start-up signals. The plurality of source drivers are coupled to the timing controller. The differential signal transmitter is installed in the timing controller and used for discontinuously transmitting an RSDS signal, which includes the plurality of data signals and the plurality of start-up signals. The plurality of differential signal receivers are installed in the plurality of source drivers and used for receiving the RSDS signal. Preferably, the differential signal transmitter is coupled to the plurality of differential signal receivers via a bus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
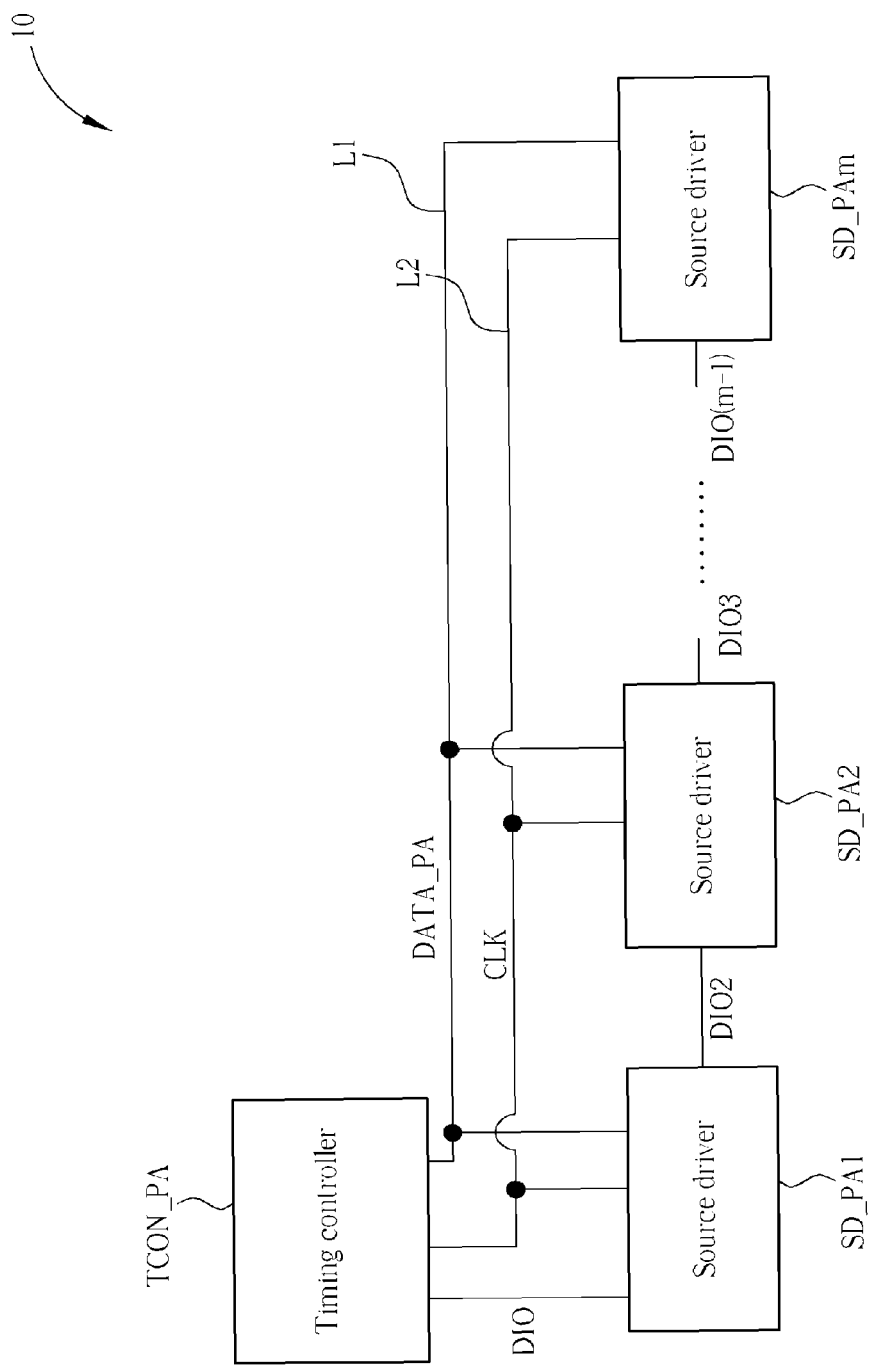
FIG. 1 is a schematic diagram of a display device according to the prior art.
Figure 2:
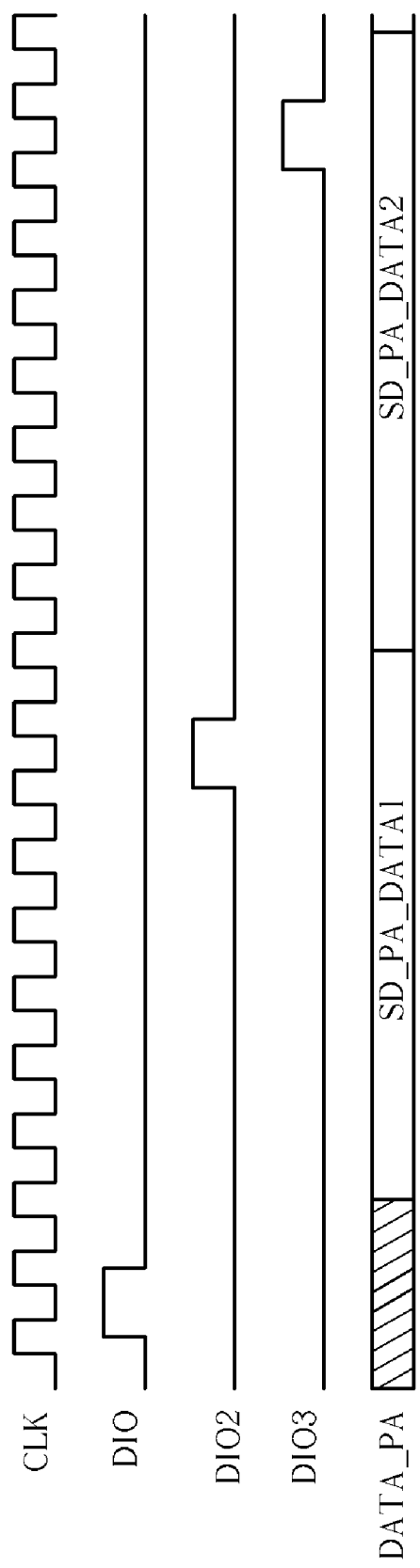
FIG. 2 is a schematic diagram of signal waveforms of the display device according to FIG. 1.
Figure 3:
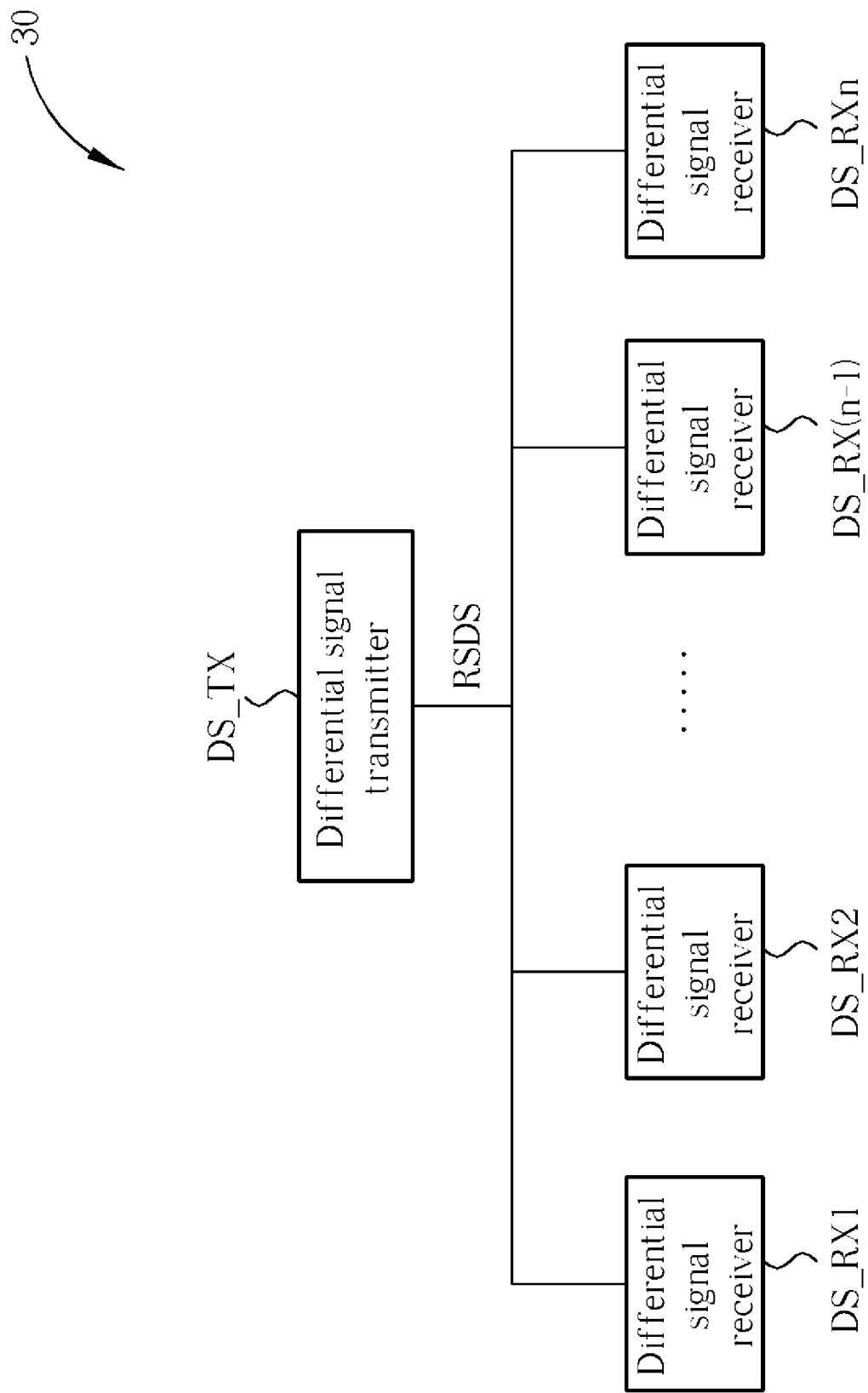
FIG. 3 is a schematic diagram of a differential signal interfacing device according to an embodiment of the present invention.

Please refer to FIG. 3, which is a schematic diagram of a differential signal interfacing device 30 according to an embodiment of the present invention. The differential signal interfacing device 30 includes a differential signal transmitter DS_TX and differential signal receivers DS_RX1-DS_RXn. The differential signal transmitter DS_TX is coupled to the differential signal receivers DS_RX1-DS_RXn via a bus, and discontinuously transmits a RSDS signal RSDS to the differential signal receivers DS_RX1-DS_RXn. The RSDS signal RSDS includes a variety of definable signal types. For example, assuming that the RSDS signal RSDS is defined to include data signals and control signals, the differential signal transmitter DS_TX arranges transmission order of the data signals and control signals in a discontinuous manner. For example, the control signals can be placed between two data signals and separated from the data signals with null signal durations, within which the transmitter DS_TX outputs no RSDS signals on the bus. Accordingly, the differential signal receivers DS_RX1-DS_RXn determine the type of received RSDS signals or their own priorities of receiving data according to discontinuity of the RSDS signal RSDS.

Figure 4:
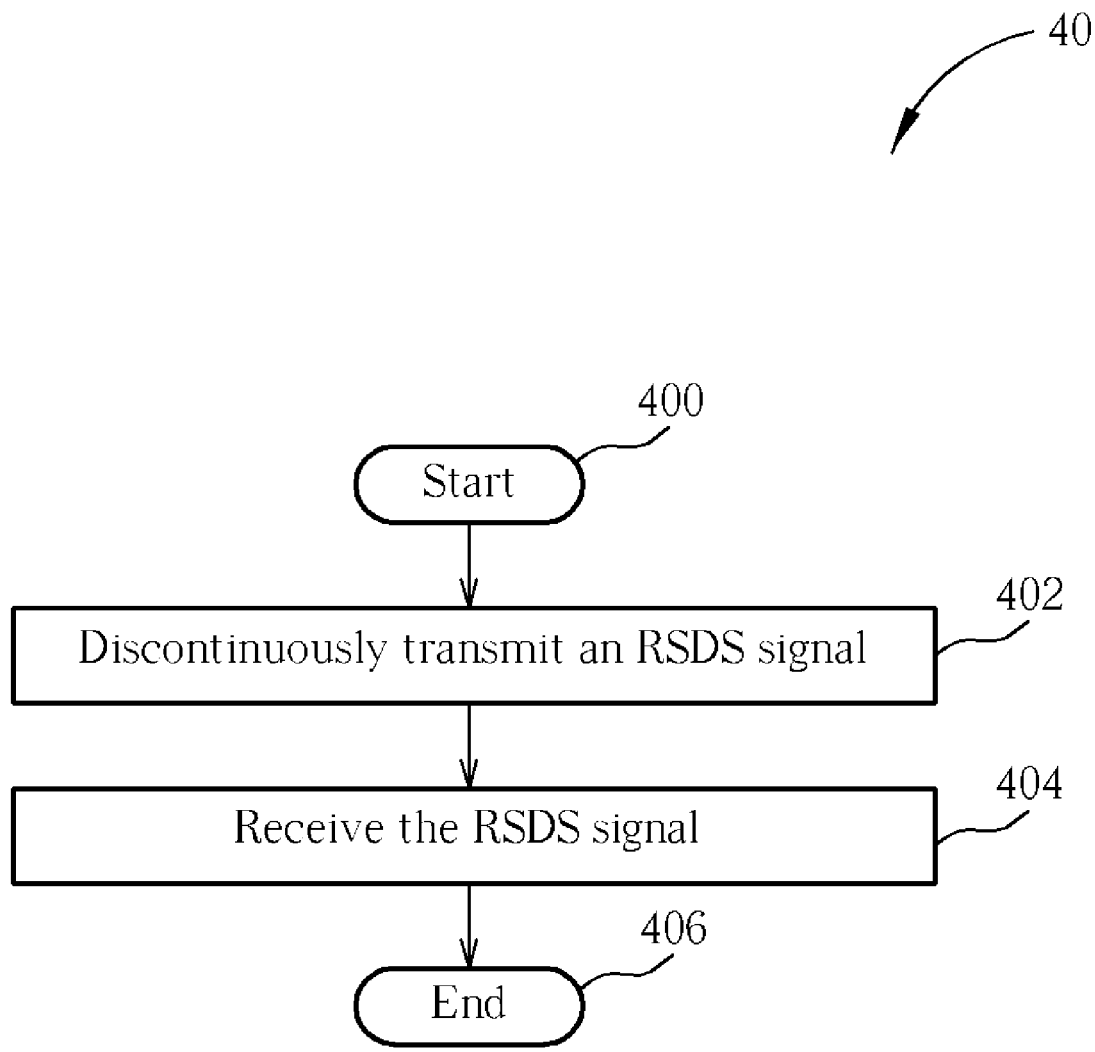
FIG. 4 is a flowchart of a differential signaling process according to an embodiment of the present invention.

Please refer to FIG. 4, which is a flowchart of a differential signaling process 40 according to an embodiment of the present invention. The differential signaling process 40 is preferably applied to a system adopting a bus as a transmission interface between transmitters and receivers. The differential signaling process 40 includes the following steps:

Step 400: Start.
Step 402: Discontinuously transmit an RSDS signal.
Step 404: Receive the RSDS signal.
Step 406: End.

In the differential signaling process 40, the RSDS signal includes various signal types, such as data and control signal types. The signals having different types are discontinuously transmitted by the transmitters, and then the signals are received by the receivers and the signal types are determined at the receivers according to the discontinuity of the RSDS signal.

Figure 5:
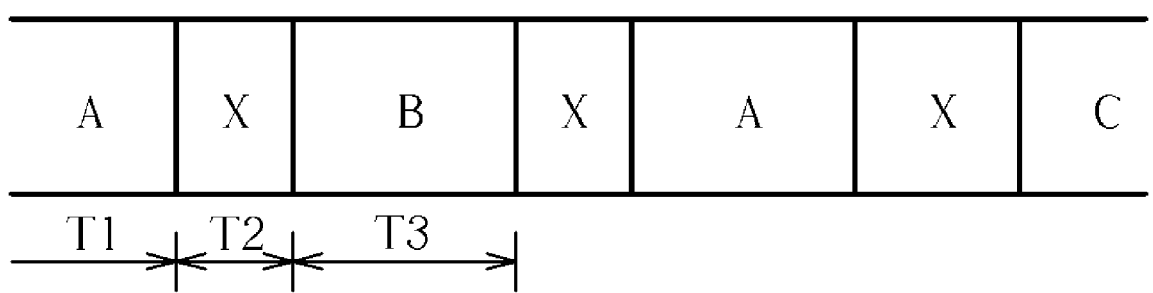
FIG. 5 is a timing diagram of the RSDS signals according to an embodiment of the present invention.

Please refer to FIG. 5, which is a timing diagram of the RSDS signals according to an embodiment of the present invention. In FIGS. 5, A, B and C represent different signal types, whereas X represents the null durations. The transmitter transmits the A-type RSDS signal during an interval T1 and outputs no RSDS signals during an interval T2, and then transmits the B-type RSDS signal during an interval T3, and so forth. From the above disclosure, the advantage of discontinuously transmitting the RSDS signal can be understood.

In general, the RSDS signaling interface is used in a driving circuit of a display device. Please refer to FIG. 6, which is a schematic diagram of a display device 60 according to an embodiment of the present invention. The display device 60 includes a timing controller TCON and source drivers SD1-SDm. The timing controller TCON transmits an RSDS signal RSDATA (including the SP1-SPm and DATA1-DATAm) via a transmission line pair L1 and transmits a clock signal CLK via a transmission line pair L2. In addition, the timing controller TCON further transmits an enabling signal DIOEN using TTL signal form to the source drivers SD1, and the source drivers SD1-SDm transmit the enabling signal DIOEN in a cascading manner. Except for the source drivers SDm, the source drivers SD1-SD(m-1) accumulatively delay the enabling signal DIOEN, and thereby generate the enabling signals DIOEN2-DIOEN(m-1), respectively. The DIOEN-DIOEN(m-1) are used as indications of the start-up signals SP1-SPm. For example, the enabling signals trigger the source drivers to switch the source drivers into a waiting mode such that the source drivers wait for receiving a following RSDS signals, and thereby the source drivers take the firstly received RSDS signal as the start-up signals. In addition, the timing controller TCON arranges the timings the start-up signal SP1-SPm arrive the source drivers SD1-SDm within or after corresponding enabling durations of the enabling signals DIOEN-DIOEN(m-1). As a result, the first RSDS signals received by the source drivers SD1-SDm must be the start-up signals SP1-SPm after/when the enabling signals DIOEN-DIOEN(m-1) are received.

In the display device 60, the timing controller TCON generates the RSDS signals RSDATA including data signals DATA1-DATAm and start-up signals SP1-SPm, corresponding to the source drivers SD1-SDm, respectively. The start-up signals SP1-SPm are used for triggering the source drivers SD1-SDm to prepare for reception of the data signals DATA1-DATAm. A differential signal transmitter TX, installed inside the timing controller TCON, discontinuously transmits the RSDS signals RSDATA via a transmission line pair L1 to separate the data signals DATA1-DATAm and start-up signals SP1-SPm. The differential signal receivers RX1-RXm, installed inside the source drivers SD1-SDm, are used to receive the RSDS signals RSDATA. Accordingly, because of the above-mentioned signals (DIOEN-DIOENm, SP1-SPm), when the differential signal receivers RX1-RXm receive the RSDS signal RSDATA, the differential signal receivers RX1-RXm are able to determine the current RSDS signal RSDATA corresponds to data or start-up signal.

When the display device 60 outputs an image frame to its panel, the timing controller TCON transmits the enabling signal DIOEN to the source driver SD1 as an indication of the start-up signal SP1. The source drivers SD1 waits for the first incoming RSDS signal and thereby determines that the received RSDS signal corresponds to the start-up signal SP1. And then, the start-up signal SP1 triggers the source driver SD1 to prepare for reception of image data. That is, the source driver SD1 starts to receive the data signal DATA1 after waiting a predefined time later after the start-up signal SP1. In addition, the source driver SD1 outputs the enabling signal DIOEN2 to the source driver SD2. Similarly, this allows the source driver SD2 to identify the start-up signal SP2 and then derive the data signal DATA2 from the RSDS signal after waiting the predefined time later after the start-up signal SP2. The rest of the source drivers operate similarly to the source drivers SD1 and SD2 for reception of the data signals DATA3-DATAm.

Figure 6:
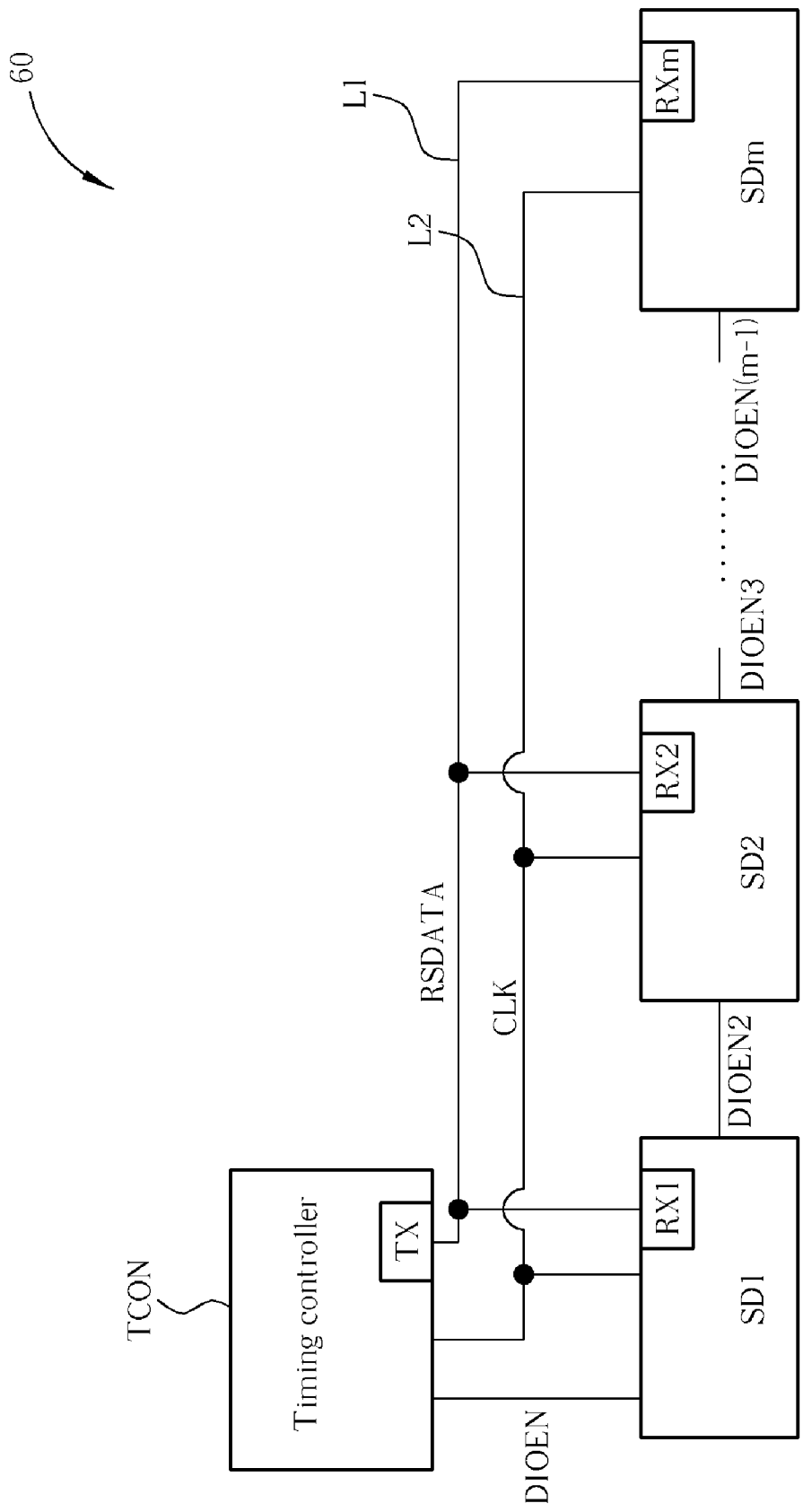
FIG. 6 is a schematic diagram of a display device according to embodiment of the present invention.
Figure 7:
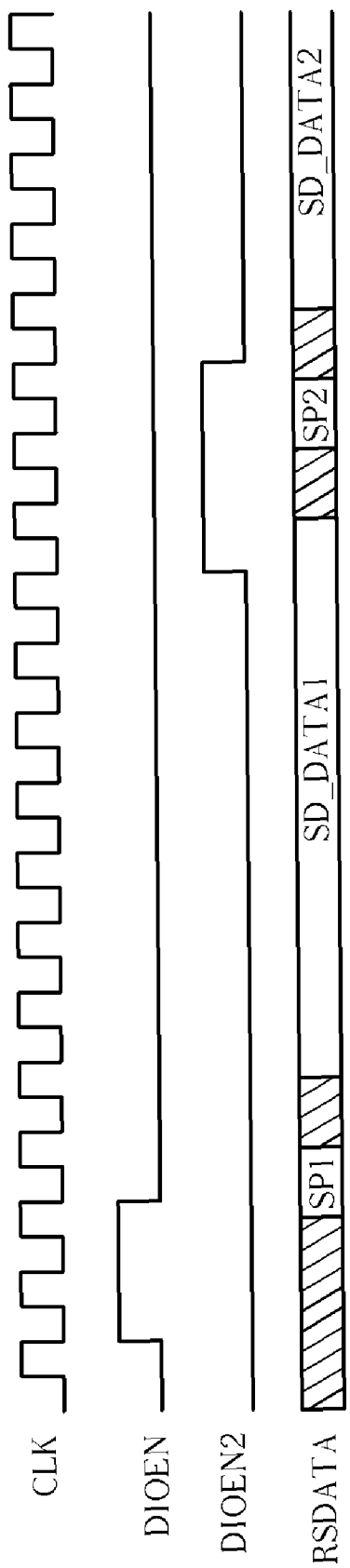
FIG. 7 is a timing diagram of signals of the display device shown in FIG. 6.

Please refer to FIG. 7, which is a timing diagram of signals corresponding to the display device 60 shown in FIG. 6. From top to bottom, the signal waveforms are the clock signal CLK, the enabling signal DIO, the enabling signal DIO2 and the RSDS signal RSDATA. FIG. 7 merely shows partial waveforms for simplicity. For example, in FIG. 7, the RSDS signal RSDATA only includes the start-up signals SP1 and SP2, and the data signals SD_DATA1 and SD_DATA2 for simplicity. Obliquely lined durations included in the RSDS signal RSDATA represent the time durations that the timing controller TCON outputs no RSDS signal on the transmission line pair L1.

The start-up signals SP1-SPm are separated with the data signals SD_DATA1-SD_DATAm by the same predefined time, respectively, in order to keep the source drivers SD1-SDm receiving data at the right time. Please note that the clock signal CLK, the start-up signals SP1-SPm and the data signals SD_DATA1-SD_DATAm are in the RSDS form, and thereby the skew between these signals are easy to be adjusted for the optimum setup/hold time.

In the display device 60, the enabling signals DIOEN-DIOENm and the start-up signals SP1~SPm do not have such a strict relationship, by which the enabling signals DIOEN-DIOENm can only be delayed for less than a clock cycle provided by the clock signal CLK. As a result, the display device 60 has flexibility in system frequency adjustment. In real practice, the timings the start-up signals SP1-SPm arrive the source drivers just need to be arranged within the enabling durations of the enabling signals DIOEN-DIOENm. Alternatively, the start-up signals SP1~SPm are the first RSDS signal received by the source drivers after the enabling durations. In other words, the source drivers SD1-SDm can detect the start-up signals SP1~SPm within or after the enabling signals DIOEN-DIOENm. In FIG. 7, the enabling signals DIOEN and DIOEN2 have a flexible timing relationship with the data signals SD_DATA1 and SD_DATA2 while the start-up signals SP1 and SP2 have a fixed relationship with those signals.

In summary, the embodiments of the present invention embed the start-up and data signals into an RSDS signal by discontinuously transmitting the RSDS signal. The start-up and data signals are facile for the timing and skew controls, thereby preventing the source drivers from receiving data at the wrong times. In addition, the present invention enhances capacity of the RSDS interface and transmission efficiency.

Those skilled in the art will readily observe that numerous modifications and alterations of the device and method may be made while retaining the teachings of the invention.

What is claimed is:

1. A display device for improving internal transmission efficiency, the display device comprising:
   a timing controller for generating a plurality of data signals and a plurality of start-up signals;
   a plurality of source drivers coupled to the timing controller;
   a differential signal transmitter installed in the timing controller, for discontinuously transmitting a reduced swing differential signaling (RSDS) signal comprising the plurality of data signals and the plurality of start-up signals; and
   a plurality of differential signal receivers installed in the plurality of source drivers, for receiving the RSDS signal;
   wherein the differential signal transmitter stops transmission between one of the plurality of the start-up signals and one of the plurality of the data signals for a corresponding source driver of the plurality of the source driver to determine a type of the received RSDS signal and wherein the differential signal transmitter transmits to the corresponding source driver the start-up signal first and then the data signal in the order.

2. The display device of claim 1, wherein each of the plurality of data signals corresponds to one of the plurality of source drivers.

3. The display device of claim 1, wherein each of the plurality of start-up signals corresponds to one of the plurality of source drivers.

4. The display device of claim 1, wherein the plurality of the source drivers are cascade-connected, and when a first source driver of the plurality of the source drivers receives an enabling signal from the timing controller, the first source driver delays the enabling signal for a predetermined time and then transmits the delayed enabling signal to a second source driver of the plurality of the source drivers.

5. The display device of claim 4, wherein the second source driver determines that a currently received RSDS signal is one of the plurality of start-up signals according to the delayed enabling signal.

6. The display device of claim 4, wherein the timing controller is coupled to the plurality of source drivers via a bus.

7. A method for improving internal transmission efficiency of a display device, the method comprising:
   a timing controller of the display device generating a plurality of data signals and a plurality of start-up signals;
   wherein the plurality of the data signals and the plurality of the start-up signals are reduced swing differential signaling (RSDS) signals; and
   a plurality of source drivers of the display device receiving the plurality of the data signals, and the plurality of the start-up signals from the timing controller;
   wherein the timing controller stops transmission between one of the plurality of the start-up signals and one of the plurality of the data signals for a corresponding source driver of the plurality of the source drivers to determine a type of a corresponding received RSDS signal.

8. The method of claim 7, wherein the timing controller of the display device generating the plurality of the data signals and the plurality of the start-up signals comprises:
   the timing controller embedding the plurality of the start-up signals in the plurality of the data signals.

9. The method of claim 7, wherein each of the plurality of data signals corresponds to one of the plurality of source drivers.

10. The method of claim 7, wherein the plurality of the source drivers are cascade-connected, and when a first source driver of the plurality of the source drivers receives an enabling signal from the timing controller, the first source driver delays the enabling signal for a predetermined time and then transmits the delayed enabling signal to a second source driver of the plurality of the source drivers.

11. The method of claim 7, wherein the second source driver determines that a currently received RSDS signal is one of the plurality of start-up signals according to the delayed enabling signal.

12. The method of claim 7, wherein the timing controller is coupled to the plurality of source drivers via a bus.

* * * * *